United States Patent [19]
Schofield

[11] Patent Number: 5,138,675
[45] Date of Patent: Aug. 11, 1992

[54] MODE SCRAMBLER AS AN OPTICAL ISOLATOR FOR HIGHER-COHERENCE LASERS IN MULTI-MODE FIBER PLANTS

[75] Inventor: Bruce A. Schofield, Tyngsboro, Mass.

[73] Assignee: Digital Equipment Corporation, Maynard, Mass.

[21] Appl. No.: 713,900

[22] Filed: Jun. 12, 1991

[51] Int. Cl.$^5$ .............................................. G02B 6/28
[52] U.S. Cl. ....................................... 385/28; 385/27; 385/29; 385/88; 372/6
[58] Field of Search .................................... 385/27–29, 385/88; 372/6

[56] References Cited

U.S. PATENT DOCUMENTS

| | | | |
|---|---|---|---|
| 4,229,067 | 10/1980 | Love | 385/28 |
| 4,804,248 | 2/1989 | Bhagavatula | 385/28 |
| 4,815,806 | 3/1989 | Owen | 372/703 |
| 4,895,421 | 1/1990 | Kim et al. | 385/28 |
| 5,028,118 | 7/1991 | Facq et al. | 385/28 |
| 5,077,814 | 12/1991 | Shigematsu et al. | 385/28 |

OTHER PUBLICATIONS

Wilson, D. K., "Optical Isolators Adapt to Communication Needs," *Laser Focus World*, Apr. 1991.

*Primary Examiner*—Georgia Y. Epps
*Attorney, Agent, or Firm*—Cesari and McKenna

[57] ABSTRACT

A fiber-optic communication system (10) employs a Fabry-Perot laser (14) that launches its output onto a single-mode pigtail (16) physically coupled to a mode scrambler (22), which is air coupled to a transmission medium consisting of multi-mode fiber-optic cable. Because the mode scrambler (22) divides the laser output power among many modes, the fraction of any reflected light that is coupled back into the cavity of the laser (14) can be made small enough to permit sufficient laser coherence for high-data-rate-transmission.

22 Claims, 1 Drawing Sheet

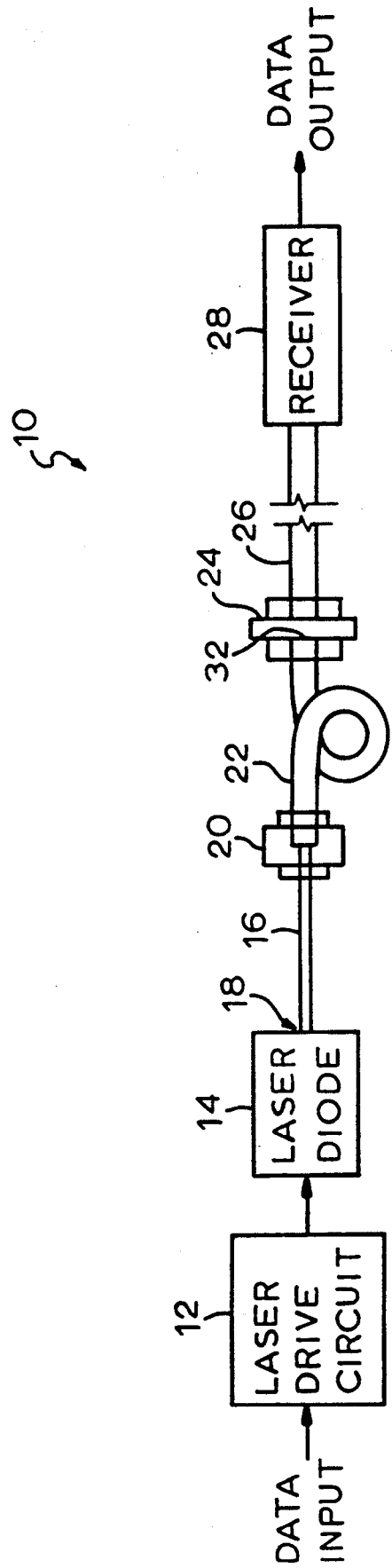

MODE SCRAMBLER AS AN OPTICAL ISOLATOR FOR HIGHER-COHERENCE LASERS IN MULTI-MODE FIBER PLANTS

BACKGROUND OF THE INVENTION

The present invention is directed to optical communication systems and in particular to the optical isolators that they use.

The American National Standards Institute (ANSI) has developed two generations of major specifications for local-area network (LANs) and is currently developing the third generation. Ethernet can be viewed as the first major LAN specification. It was intended primarily for LANs that use coaxialcable (RG-8) transmission media and operate at 10 Mb/sec., although the basic Ethernet protocol has also been employed with other types of transmission media. The Ethernet specification was completed in 1982. The second major LAN specification was the Fiber Distribution Data Interface (FDDI) specification. FDDI, completed in 1990, is intended for LANs that operate at 100 Mb/sec. on multi-mode fiber with non-physical-contact connectors and use standard (non-lasing) light-emitting diodes (LEDs), although proposals have been made to use the FDDI protocol with other types of media and signal sources, too. The specifics of the third generation are not yet clear, but it will be intended for LANs that operate at 1,000 Mb/sec. (1 Gb/sec.), use laser diodes, and employ single-mode fiber with physical-contact connectors.

This progression of signal sources and transmission media results in large part from cost considerations. LEDs and non-physical-contact connectors are adequate for FDDI-rate transmission and are much less expensive than laser diodes and physical-contact connectors. They are thus the source and connection type of choice for FDDI LANs, and this choice dictates the use of multi-mode fibers; non-lasing diodes do not produce the spatial coherence necessary to couple light efficiently into single-mode fibers.

But the initial choice of lower-cost, standard-LED transmission and non-physical-contract connectors for an FDDI LAN presents the user with a problem if he wants the flexibility to expand to the next, 1-Gb/sec. standard at some point: will he have to bear the expense of "re-wiring" with physical-contact connectors and single-mode fiber in order to upgrade? If so, the apparent cost benefits of the standard-LED, non-physical-contact FDDI system may be illusory.

Answering this re-wiring question involves considering the reasons for using single-mode fibers and physical-contact connectors for high data rates. The reason for using single-mode fibers for high data rates is that multi-mode fibers suffer from intermodal dispersion, which can degrade the optical signal to an extent that is unacceptable for high data rates. Fortunately, the extent of the degradation depends on the length of the cable, so the intermodal dispersion associated with multi-mode fibers can be tolerated even at very high data rates if the cable is only as long as those employed in many local-area networks. If his cable runs are short, therefore, the user avoids the need to employ multi-mode cable.

But physical-contact connectors are necessary at high data rates even if the cable is short: as a practical matter, transmission in the 1-Gb/sec. range requires the use of lasers, and laser coherence can suffer from the effects of light reflected back into the laser cavity by non-physical-contact connectors. The "medium" level of laser coherence required for 1-Gb/sec. transmission can usually be sustained in the face of reflections from physical-contact connectors if only minor measures are taken to minimize reflections in coupling the laser output to the optic fiber. But more-serious measures must be taken to maintain enough coherence if the network employs non-physical-contact connectors. Specifically, optical isolators must be interposed between the laser and the cable.

Unfortunately, conventional optical isolators, which use polarization effects to attenuate reflected light, are quite expensive; in some cases it would be less expensive simply to rewire with physical-contact connectors (and, typically, single-mode cable) than to keep the existing non-physical-contact plant and employ an optical isolator at each transmitter.

SUMMARY OF THE INVENTION

The present invention represents a way to reduce isolator cost for non-physical-contact networks and thus make it more attractive to upgrade them to higher data rates and thus to install them initially. According to the invention, a mode scrambler is used in place of a conventional optical isolator. Specifically, the transmitter employs a laser coupled to one end of a pigtail, preferably one that supports only a single mode of light propagation. The pigtail's other end is physically coupled—e.g., by contact coupling or fiber fusion—to a mode scrambler, which divides the laser-light energy more or less evenly among a large number of modes. The mode scrambler couples the thus-scrambled light into the transmission cable, which is typically a multi-mode graded-index cable. If the optical power has been divided among enough modes, the fraction of any reflected power that is coupled back into the pigtail and from there into the laser cavity can be small enough that it does not detract unacceptably from the laser's coherence. Moreover, use of a mode scrambler minimizes speckle-pattern noise, since the resulting division of laser power among the many modes tends to reduce the spatial power variations that give rise to such noise.

BRIEF DESCRIPTION OF THE DRAWING

These and further features and advantages of the present invention are described below in connection with the accompanying drawing, which is a diagrammatic representation of a fiber-optic communications system that employs the teachings of the invention.

DETAILED DESCRIPTION OF ILLUSTRATIVE EMBODIMENT

The drawing depicts a fiber-optic communications system 10 in which an electrical input signal is applied to a laser driver 12, which so controls a laser 14 that the laser output represents data that the driver receives. The laser 14 launches its output into a single-mode pigtail 16. While the laser type is not critical to the invention, the laser for a system that employs, say, 1300-nm infrared light to transmit at 1 Gb/sec. would typically be of the Fabry-Perot type, which is capable of what I will call the "medium" level of coherence necessary for 1-Gb/sec. transmission.

The pigtail 16 has the conventional low-reflectance end 18 properly aligned with the laser for the desired launch efficiency. (To reduce reflection effects, the alignment may intentionally be made sub-optimal from an efficiency standpoint.) For 1300-nm light, the pigtail's mode-field diameter would typically be between 8.5 μm and 10.0 μm in most fiber types to single-mode performance. (I will use the phrase *mode-field diameter* instead of the more-common phrase *core diameter* in recognition of the fact that not all cores are circular.) As is conventional, the pigtail should be long enough to ensure adequate attenuation of the non-supported modes.

A connector 20 makes a physical-contact connection between the single-mode pigtail and a mode scrambler 22, which may, for instance, be a two-meter length of step-index fiber-optic cable that supports multi-mode propagation at 1300 nm. The drawing suggests a bend in the cable, which a mode scrambler might use to ensure full and even division of the light into the available modes. Although this form of mode scrambling is desirably simple, other forms can also be employed in embodiments of this invention. For example, mode scramblers have been constructed by joining two lengths of step-index cable with an intervening length of graded-index cable.

A conventional air-gap connector 24 connects the other end of the mode scrambler 22 to the transmission cable 26, which can be, for example, a graded-index multi-mode cable of the type defined by the FDDI specification. For high data rates such as 1 Gb/sec., the transmission-cable length must be limited, but acceptable bit-error rates can be achieved in cable lengths on the order of a few hundreds of meters. Such lengths are adequate for many local-area-network applications.

At the other end of the transmission cable 26 is a conventional optical receiver 28, which converts the light signal to an electrical signal in the usual manner.

The mode scrambler 22 operates by more or less evenly dividing the power received from the single-mode pigtail 16 among many modes. Any reflected power will be similarly divided, so the reflected power in the mode that can efficiently be coupled into the pigtail is only a small fraction of the total reflected power if the number of modes is large.

The number of modes that the mode scrambler 22 can support depends on its core area. For the illustrated system, I prefer that the scrambler have the FDDI-specified mode-field diameter of 62.5 μm, which, for a 9-μm pigtail, makes the ratio of scrambler core area to pigtail core area equal to forty-eight. Given the resulting mode population, the attenuation that characterizes the coupling of reflected light from the scrambler 22 into the pigtail 16 is 17 db.

The greatest potential reflection source is an index discontinuity at the far end 32 of the mode scrambler 22. The return loss characterizing this reflection can be as low as 14 db for the types of components that the illustrated embodiment employs. Added to the 17-db loss in the scrambler, this yields a total reflection loss of at least 31 db, which is slightly better than the 30-db minimum return loss specified in an existing fiber-optic circuit that employs all single-mode fibers and physical-contact connectors and reliably supports 1-Gb/sec. data transmission. Even a pigtail having a mode-field diameter as high as 10 μm and thus yielding an area ratio of thirty-nine still meets the 30-db minimum-loss specification. Moreover, some systems may be able to accept minimum return losses as low as, say, 20 db, in which case a ratio as low as two would suffice. Without replacing existing multi-mode cable or using high-cost conventional optical isolators, therefore, one can obtain the high-bit-rate capability of medium-coherence lasers by employing the teachings of the present invention.

Increased isolation can be obtained by increasing the scrambler's mode population—i.e., by increasing its mode-field diameter—but an increase beyond the 62.5-μm diameter mentioned above results in an increased forward loss at the connection between the mode scrambler 32 and the transmission cable 26 if the latter is an FDDI-specification 62.5-μm-core transmission cable. From a 62.5-nm-core scrambler, on the other hand, the forward loss in an air coupling to such a transmission cable can be negligible (less than 1 db) if the numerical-aperture relationship between the scrambler and the transmission cable is optimized.

Of course, the transmission cable 26 can support many modes, just as the scrambler 22 can. But if the pigtail 16 were coupled directly to the transmission cable 26 without a mode scrambler, the number of modes by which significant light power would actually propagate in as short a length of the usual graded-index multi-mode fiber as is used in most local-area networks would be only a small fraction of the potential number. This is because the inter-mode coupling in a few hundred meters of such cables is not usually great enough to transfer much power from the single initial mode to many of the other potential modes. Since much of the reflected light's optical power would remain in the primary mode without a scrambler, the reflected-light intensity in the laser cavity could still be too great to permit high-data-rate operation.

Although the invention has been described above in connection with a specific embodiment, it will be apparent that its principles can be employed in a wide range of systems. For instance, the air-gap coupling between the scrambler and the transmission cable, although convenient in upgraded systems, is not necessary; physical coupling could be used instead. Additionally, although the pigtail 16 must be physically coupled to the mode scrambler 22 if reflection at that junction is to be kept low enough not to impair laser coherence significantly, that coupling need not be made by a contact coupler; the pigtail and scrambler fibers might be fused together, for instance.

Furthermore, the broader aspects of the invention do not require the use of a Fabry-Perot laser; clearly, any medium-coherence laser is appropriate. A medium-coherence laser based on the multiple-quantum-will principle, for instance, may be employed. Indeed, lower-coherence lasers can be used, too, although those with very-low coherence tend to be relatively immune to the effects of reflection and thus may not require the isolation that the present invention affords. Higher-coherence lasers, including some of the distributed-feedback type, can also be used unless the required spectral purity is too great to tolerate even the low level of reflection that occurs at the input end 18 of a well-designed pigtail 16.

It is thus apparent that the invention described above can be employed in a wide range of embodiments and constitutes a significant advance in the art.

I claim:

1. For launching light of a given wavelength into a transmission cable capable of supporting a plurality of propagation modes of the given wavelength, a transmission apparatus comprising:

A) a laser that generates light of the given wavelength;

B) a pigtail optically coupled to the laser for introduction of laser light into one end of the pigtail; and C) a mode scrambler that supports more propagation modes than the pigtail can, has first and second ends, is optically coupled physically at its first end to the other end of the pigtail, and is adapted for optical coupling at its second end to a transmission cable, whereby the power in laser light reflected back into the mode scrambler is divided among a plurality of modes in the mode scrambler so that only a fraction of the power in any reflected light thus scrambled is coupled back into the pigtail and thereby returned to the laser.

2. A transmission apparatus as defined in claim 1 wherein the laser is a Fabry-Perot laser.

3. A transmission apparatus as defined in claim 1 wherein the ratio of the scrambler core area to the pigtail core area is at least two.

4. A transmission apparatus as defined in claim 3 wherein the ratio of the scrambler core area to the pigtail core area is at least thirty-nine.

5. A transmission apparatus as defined in claim 4 wherein the pigtail can support only a single propagation mode at the given wavelength.

6. A transmission apparatus as defined in claim 3 wherein the pigtail can support only a single propagation mode at the given wavelength.

7. A transmission apparatus as defined in claim 2 wherein the pigtail can support only a single propagation mode at the given wavelength.

8. A transmission apparatus as defined in claim 1 wherein the pigtail can support only a single propagation mode at the given wavelength.

9. For launching light of a given wavelength into a transmission cable capable of supporting a plurality of propagation modes of the given wavelength, a transmission apparatus comprising:

A) a Fabry-Perot laser that generates laser light of the given wavelength;

B) a pigtail capable of supporting only a single propagation mode at the given wavelength and optically coupled to the laser for introduction of the laser light into one end of the pigtail; and C) a mode scrambler having first and second ends and a core area at least thirty-nine times that of the pigtail, the mode scrambler being optically coupled physically at its first end to the other end of the pigtail and adapted for optical coupling at its second end to a transmission cable, whereby the power in laser light reflected back into the mode scrambler is divided among a plurality of modes in the mode scrambler so that only a fraction of the power in any reflected light thus scrambled is coupled back into the pigtail and thereby returned to the laser.

10. For transmitting optical signals to an optical receiver, an optical communications system comprising:

A) a laser that generates laser light of a given wavelength;

B) a pigtail optically coupled to the laser for introduction of the laser light into one end of the pigtail;

C) a mode scrambler that supports more propagation modes than the pigtail can, has first and second ends, and is optically coupled physically at its first end to the other end of the pigtail; and D) a fiber-optic transmission cable optically coupled at one end to the second end of the mode scrambler and adapted for optical coupling at its other end to an optical receiver, whereby the power in laser light reflected back into the mode scrambler is divided among a plurality of modes in the mode scrambler so that only a fraction of the power in any reflected light thus scrambled is coupled back into the pigtail and thereby returned to the laser.

11. An optical communications system as defined in claim 10 wherein the transmission cable can support a plurality of propagation modes at the given wavelength.

12. An optical communications system as defined in claim 11 wherein the transmission cable is a graded-index cable.

13. An optical communications system as defined in claim 12 wherein the pigtail can support only a single propagation mode at the given wavelength.

14. An optical communications system as defined in claim 11 wherein the pigtail can support only a single propagation mode at the given wavelength.

15. An optical communications system as defined in claim 10 wherein the pigtail can support only a single propagation mode at the given wavelength.

16. An optical communications system as defined in claim 10 wherein the laser is a Fabry-Perot laser.

17. A transmission apparatus as defined in claim 16 wherein the pigtail can support only a single propagation mode at the given wavelength.

18. An optical communications system as defined in claim 10 wherein the ratio of the area of the scrambler core to that of the pigtail core is at least two.

19. An optical communications system as defined in claim 18 wherein the ratio of the area of the scrambler core to that of the pigtail core is at least thirty-nine.

20. A transmission apparatus as defined in claim 19 wherein the pigtail can support only a single propagation mode at the given wavelength.

21. A transmission apparatus as defined in claim 18 wherein the pigtail can support only a single propagation made at the given wavelength.

22. For transmitting optical signals to an optical receiver, an optical communications system comprising:

A) a Fabry-Perot laser that generates laser light of a given wavelength,

B) a pigtail capable of supporting only a single propagation mode at the given wavelength and optically coupled to the laser for introduction of the laser light into one end of the pigtail;

C) a mode scrambler having first and second ends and a core area at least thirty-nine times that of the pigtail and being optically coupled physically at its first end to the other end of the pigtail; and D) a graded-index fiber-optic transmission cable capable of supporting a plurality of propagation modes of the given wavelength, optically coupled at one end to the second end of the mode scrambler, and adapted for optical coupling at its other end to an optical receiver, whereby the power in laser light reflected back into the mode scrambler is divided among a plurality of modes in the mode scrambler so that only a fraction of the power in any reflected light thus scrambled is coupled back into the pigtail and thereby returned to the laser.

* * * * *